3,010,239
FISHING SIGNAL DEVICE
Vernon R. Johnson, Vale, S. Dak.
(705 7th St., Spearfish, S. Dak.)
Filed Nov. 13, 1959, Ser. No. 852,866
1 Claim. (Cl. 43—17)

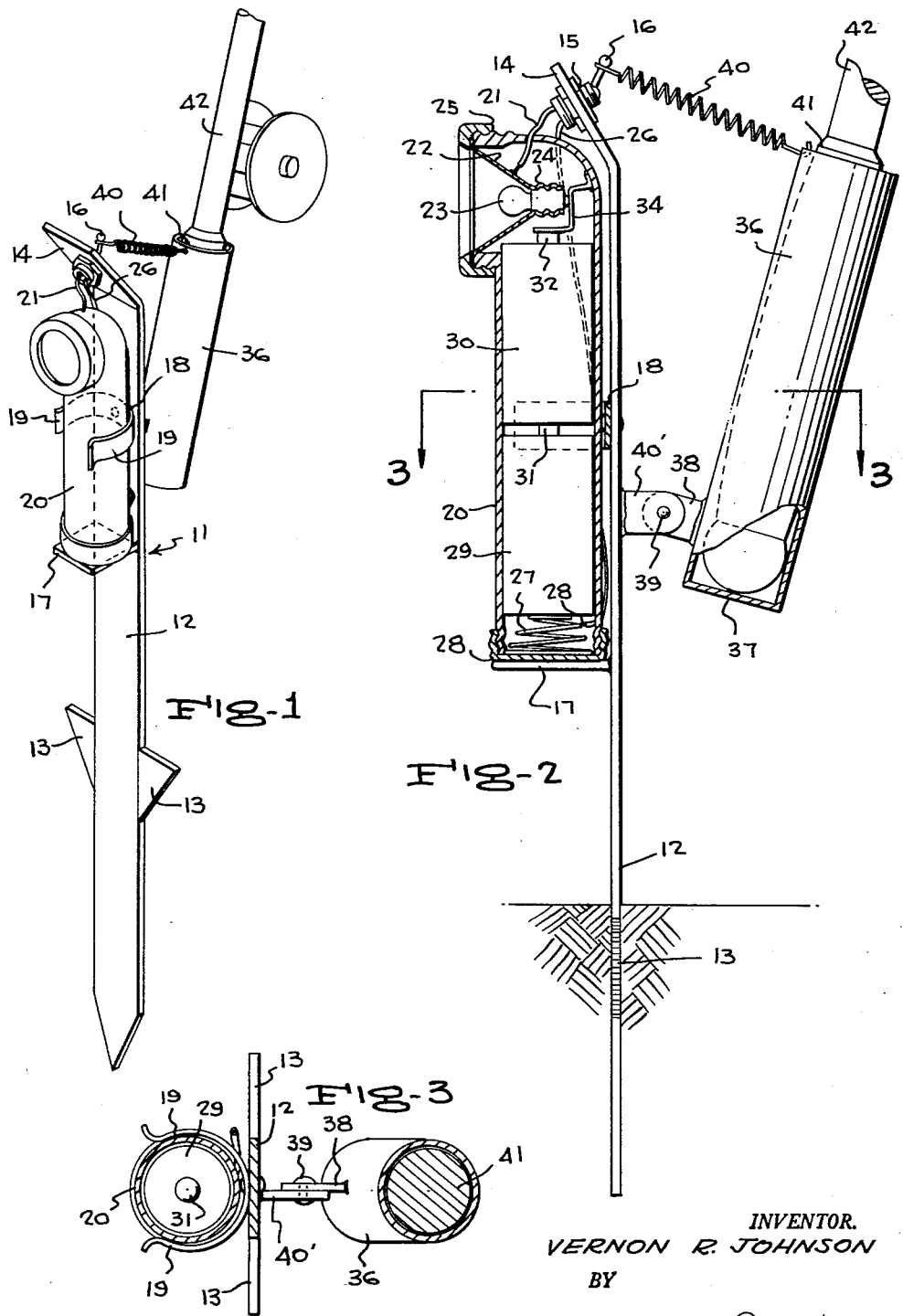

This invention relates to fishing rod supports, and more particularly to a device for supporting a fishing rod in operative position and which is arranged to flash a visual signal in response to a pull on the line associated with the fishing rod.

A main object of the invention is to provide a novel and improved fishing signaling device which is simple in construction, which is easy to set up for use, and which involves relatively inexpensive components.

A further object of the invention is to provide an improved fishing signal device in the form of a fishing rod holder, the device being arranged to support a fishing rod in an operative position and to provide a visible light signal in response to a pull on the line associated with the fishing rod, the device being durable in construction, being relatively compact in size, and being reliable in operation.

Further objects and advantages of the invention will become apparent from the following description and claim, and from the accompanying drawings, wherein:

FIGURE 1 is a perspective view of an improved fishing signal device according to the present invention, shown supporting the handle portion of a fishing rod in the socket member thereof.

FIGURE 2 is an enlarged vertical cross sectional view taken through the signal device illustrated in FIGURE 1, the device being shown embedded in the ground in an upright position and ready for operation.

FIGURE 3 is a horizontal cross sectional view taken on the line 3—3 of FIGURE 2.

Referring to the drawings, 11 generally designates an improved fishing signal device according to the present invention. The signal device 11 comprises a stake member 12 of suitable rigid material adapted to be embedded in the ground so as to be supported in an upright position, the stake member being provided with a pair of opposed triangular flanges 13, 13 to stabilize same when it is inserted in the ground in the manner illustrated in FIGURE 2. The stake member 12 is formed of relatively flat bar material, and is formed at its top end with an upwardly and laterally inclined portion 14 in which is mounted a conventional toggle switch 15 provided with an upstanding operating lever 16.

Rigidly secured to the stake member at its intermediate portion is a horizontally extending shelf member 17 and secured to the stake member 12 above the shelf member is a flashlight clip 18 of generally U-shaped construction and being provided with resilient opposed clamping fingers 19, 19. Designated at 20 is a flashlight of substantially conventional construction which is supported on the shelf member 17 and engaged between the resilient opposed clamping fingers 19, 19, whereby the flashlight is supported in an upright position subjacent the inclined top portion 14 of the stake member 12, as is clearly illustrated in FIGURE 2.

One terminal of switch 15 is connected by a suitably insulated wire 21 to the metal reflector 22 of the flashlight, the reflector being electrically connected to the shell of the flashlight bulb 23 through the threaded socket portion 24 of the reflector, as shown in FIGURE 2. The insulated wire 21 extends through a suitable opening 25 provided in the top wall of the housing of flashlight 20.

A second suitably insulated wire 26 extends through an opening provided in the lower portion of the housing of flashlight 20 and is electrically connected to the coiled spring 27, as by a solder connection 28, the coiled spring 27 being interposed between the metal cover 28 of the flashlight housing and the casing of the lowermost flashlight battery 29. A second flashlight battery 30 is provided in the housing of the flashlight, the second battery being disposed above the first battery 29 with the bottom end of its casing in contact with the center pole 31 of the lowermost flashlight battery, as shown in FIGURE 2. The center pole 32 of the uppermost flashlight battery 30 is electrically connected to the center contact of the flashlight bulb 23 by a suitable conductive bracket 34 which is suitable secured to the upper portion of the housing of the flashlight and which is mounted so as to simultaneously engage the center contact of the lamp 23 and the center contact 32 of battery 30.

It will be understood that the main body portion of the housing of the flashlight is made of insulating material, or alternatively, the reflector 22 is suitable insulated with respect to the main body of the flashlight housing, as is the supporting bracket 34, so that the bulb 23 may only be energized when the switch 15 is actuated, namely, when the toggle lever 16 thereof is rotated in a clockwise direction from the position thereof shown in FIGURE 2.

The lead wire 26 extends through a suitable aperture provided in the lower portion of the housing of the flashlight 20 so that it may be soldered or otherwise suitably electrically connected at 28 to the coiled spring 27 disposed between the bottom end of the casing of flashlight battery 29 and cover cap 28.

Designated at 36 is a generally cylindrical, elongated socket member which is closed off at its bottom, as shown at 37, the socket member 36 being provided with an apertured hinged lug 38 which is pivotally connected by a rivet 39 to a hinged lug 40' rigidly secured to the stake member 12 opposite the clip member 18 and subjacent thereto. A coiled spring 40 has one end thereof engaged with the upstanding toggle lever 16 and the other end engaged with the top rim of the socket member 36, the ends of the spring being hooked, as shown in FIGURE 2, so that the hook at one end of the spring engages around the lever 16 and the hook at the other end of the spring engages through a suitable aperture provided adjacent the rim of the socket 36. The elongated socket 36 is shaped and dimensioned to receive the handle portion 41 of a fishing rod 42 so as to support the fishing rod in an upstanding position.

In operation, when the device is set up in the manner illustrated in FIGURE 2, the fishing rod is supported in an upstanding position and when a pull is exerted on the fishing line associated therewith, as when a fish is caught on the line, the rod 42 rotates downwardly, namely, in a clockwise direction, as viewed in FIGURE 2, causing the socket member 36 to similarly rotate and causing the coiled spring 40 to exert a pull on the upstanding toggle lever 16 which rotates the toggle lever from the normal position illustrated in FIGURE 2 to the right, causing the toggle switch 15 to close. This energizes the flashlight bulb 23, causing the bulb to be brightly illuminated, and providing a highly visible signal. Thus, a fisherman will be notified that a fish has been caught by the illumination of the flashlight assembly, the signal device remaining energized until the toggle switch 15 is manually reset to its open position.

While a specific embodiment of an improved fishing signal device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fishing signal device comprising a stake member formed of flat bar material adapted to be mounted vertically in the ground, said stake member having an upwardly and laterally inclined top portion defining a plate-like support, a flashlight mounted on said stake member subjacent said inclined top portion, a toggle switch mounted in the intermediate portion of said plate-like support and being operatively connected in circuit with said flashlight, said switch being provided with an upstanding operating lever which is inclined upwardly in a direction away from said inclined top portion, a socket member pivoted at its lower portion to said stake member and which is normally inclined upwardly and away from said inclined top portion substantially in the same direction as said operating lever, a fishing rod received in said socket member in an upright position, and a coiled spring connected between the top rim of said socket member and said operating lever and normally transmitting a component of the weight of said socket member and fishing rod to said operating lever insufficient to actuate same but being effective to actuate said switch responsive to rotation of said socket member in a direction away from said inclined top portion caused by an added downward load applied to said socket member through said fishing rod.

References Cited in the file of this patent

UNITED STATES PATENTS

| | | |
|---|---|---|
| 467,123 | Kuntzel | Jan. 12, 1892 |
| 2,704,411 | Carroll | Mar. 22, 1955 |
| 2,771,703 | Jones | Nov. 27, 1956 |